(12) United States Patent
Tomoda

(10) Patent No.: US 9,020,719 B2
(45) Date of Patent: Apr. 28, 2015

(54) CLUTCH CONTROL SYSTEM

(75) Inventor: Akihiko Tomoda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1543 days.

(21) Appl. No.: 12/428,974

(22) Filed: Apr. 23, 2009

(65) Prior Publication Data

US 2009/0287386 A1 Nov. 19, 2009

(30) Foreign Application Priority Data

May 13, 2008 (JP) ................................. 2008-126023

(51) Int. Cl.
*G06F 7/00* (2006.01)
*G06F 17/00* (2006.01)
*G06F 19/00* (2011.01)
*F16D 48/06* (2006.01)

(52) U.S. Cl.
CPC ...... *F16D 48/06* (2013.01); *F16D 2500/10412* (2013.01); *F16D 2500/3067* (2013.01); *F16D 2500/30808* (2013.01); *F16D 2500/3108* (2013.01); *F16D 2500/506* (2013.01); *F16D 2500/70424* (2013.01); *F16D 2500/5048* (2013.01)

(58) Field of Classification Search
USPC ...................... 701/51, 64, 67, 68; 477/70, 86; 192/3.58, 3.61, 3.63
See application file for complete search history.

(56) References Cited

U.S. PATENT DOCUMENTS

| | | | |
|---|---|---|---|
| 6,249,734 B1 * | 6/2001 | Ota ................................. | 701/51 |
| 6,358,180 B1 * | 3/2002 | Kuroda et al. .................... | 477/4 |
| 6,390,214 B1 * | 5/2002 | Takahashi et al. ......... | 180/65.26 |
| 6,484,597 B2 * | 11/2002 | Ota et al. ......................... | 74/335 |
| 7,462,130 B2 | 12/2008 | Ota et al. | |
| 2002/0074173 A1 * | 6/2002 | Morimoto et al. ........... | 180/65.2 |
| 2004/0139795 A1 * | 7/2004 | Kawakubo et al. ............. | 73/112 |
| 2004/0231951 A1 * | 11/2004 | Hasegawa et al. ............. | 192/220 |
| 2004/0238255 A1 * | 12/2004 | Kawakubo et al. ........... | 180/227 |
| 2005/0082098 A1 * | 4/2005 | Ito et al. ....................... | 180/65.2 |

(Continued)

FOREIGN PATENT DOCUMENTS

| | | |
|---|---|---|
| DE | 10 2006 000 334 A1 | 1/2007 |
| JP | 50-90020 A | 7/1975 |

(Continued)

OTHER PUBLICATIONS

AIPN English Machine Translation from Japanese of JP2877252 A.*

(Continued)

*Primary Examiner* — Jeffrey Shapiro
(74) *Attorney, Agent, or Firm* — Westerman, Hattori, Daniels & Adrian, LLP

(57) ABSTRACT

The clutch control system includes a motor in a liquid pressure modulator for engagement/disengagement of a clutch, a clutch control unit for controlling the operation of the motor, vehicle condition detection means which detects at least that an engine is in working and which detects the running speed of the vehicle, and neutral detection means for detecting the neutral state of a transmission. As controlled states of the clutch, there are set a first control state in which the clutch is in a partially engaged state or an engaged state, and a second control state in which the clutch is disengaged. When the engine being working and the vehicle speed being in excess of a predetermined value is detected and the neutral state is detected, in the first control state, transition to the second control state is effected and the clutch is disengaged.

11 Claims, 4 Drawing Sheets

(56) References Cited

U.S. PATENT DOCUMENTS

| | | | |
|---|---|---|---|
| 2005/0283298 A1* | 12/2005 | Ochi et al. | 701/67 |
| 2006/0068975 A1* | 3/2006 | Kobayashi et al. | 477/107 |
| 2006/0116239 A1* | 6/2006 | Kumazawa et al. | 477/115 |
| 2006/0128527 A1* | 6/2006 | Zenno et al. | 477/170 |
| 2006/0162979 A1* | 7/2006 | Usukura et al. | 180/230 |
| 2006/0293823 A1* | 12/2006 | Miyamaru et al. | 701/51 |
| 2007/0015624 A1* | 1/2007 | Ota et al. | 477/34 |
| 2007/0078040 A1* | 4/2007 | Nobumoto et al. | 477/70 |
| 2007/0149351 A1* | 6/2007 | Inuta | 477/70 |
| 2007/0243971 A1* | 10/2007 | Brevick | 477/70 |
| 2007/0283779 A1* | 12/2007 | Hiroi et al. | 74/473.1 |
| 2008/0103663 A1* | 5/2008 | Hiroi | 701/54 |
| 2009/0011900 A1* | 1/2009 | Zenno | 477/80 |
| 2010/0100288 A1* | 4/2010 | Zenno | 701/51 |
| 2010/0332093 A1* | 12/2010 | Ishikawa et al. | 701/62 |

FOREIGN PATENT DOCUMENTS

| | | | | |
|---|---|---|---|---|
| JP | 56-057525 A | | 5/1981 | |
| JP | 61-74917 A | | 4/1986 | |
| JP | 7-69103 A | | 3/1995 | |
| JP | 2877252 A | * | 11/1999 | B60K 23/00 |
| JP | 2004-190817 A | | 7/2004 | |
| JP | 2005-226701 A | | 8/2005 | |
| JP | 2007-285449 A | | 11/2007 | |

OTHER PUBLICATIONS

East Abstract from Japanese of JP2877252 A.*

Official Manual (hand) Translation from Japanese to English of JP2877252 A.*

* cited by examiner

CLUTCH CONTROL SYSTEM

TECHNICAL FIELD

The present invention relates to a clutch control system, particularly to a clutch control system with which the load exerted on transmission gears at the time of a gear shift from a neutral state to an in-gear condition can be reduced, by disengaging a clutch when the neutral state of a transmission is detected.

BACKGROUND OF THE INVENTION

Automatic transmissions in which engagement/disengagement of a clutch and shifting of a gear speed position are automatically conducted by an actuator have been known. In such automatic transmissions, various contrivances are adopted so that appropriate clutch control is made not only at the time of normal gear shifting but also at other times.

Japanese Patent Laid-open No. Sho 61-74917 discloses a configuration in which a clutch is kept engaged during parking of the vehicle in an in-gear condition with a predetermined gear speed selected, and, upon a gear shift to a neutral state after throwing-in of a power supply of the vehicle, the clutch is disengaged so as to enable the engine to be started.

SUMMARY OF THE INVENTION

In Japanese Patent Laid-open No. Sho 61-74917, however, much consideration has not been given to clutch control in the case where the transmission is shifted into the neutral state during working of the engine or during running of the vehicle.

In addition, provision of an actuator for controlling the clutch may easily increase the weight of the clutch system. Thus, there has been a demand for a clutch control with which the load on transmission gears at the time of gear shifting can be reduced, making it possible to reduce the weight of the transmission so as to cope with the problem of an increased system weight.

The present invention solves the above-mentioned problems and provides a clutch control system with which the load exerted on transmission gears at the time of a gear shift from a neutral state to an in-gear condition can be reduced, by disengaging a clutch when the neutral state of a transmission is detected.

In order to attain the above object, the present invention is firstly characterized in that, in a clutch a clutch control system for a clutch operative to engage and disengage transmission of a rotational driving force from an engine of a vehicle to a transmission, the clutch control system includes: an actuator for engaging and disengaging the clutch; a controller for controlling the operation of the actuator; an engine rotational speed sensor for detecting the rotating speed of the engine; a vehicle speed sensor for detecting the vehicle speed of the vehicle; and a neutral detection unit for detecting a neutral state of the transmission, wherein the control means disengages the clutch when the engine rotational speed or the vehicle speed is in excess of a predetermined value and the neutral state is detected.

In addition, the present invention is secondly characterized in that, a clutch control system for a clutch operative to engage and disengage transmission of a rotational driving force from an engine of a vehicle to a transmission, the clutch control system includes: an actuator for engaging and disengaging the clutch; a controller for controlling the operation of the actuator; vehicle condition detection unit for detecting at least that the engine is working and the vehicle speed of the vehicle; and neutral detection unit for detecting a neutral state of the transmission, wherein the controller has a first control unit which instructs the actuator to put the clutch into a partially engaged state or an engaged state, and a second control unit which instructs the actuator to put the clutch into a disengaged state; and the second control unit of the controller instructs the actuator to put the clutch into the disengaged state when it is detected that the engine is working or the vehicle speed is in excess of a predetermined value and the neutral state is detected.

Besides, the present invention is thirdly characterized in that the second control unit of the controller instructs the actuator to put the clutch into the disengaged state when a predetermined time has passed with the neutral state being detected continuously.

In addition, the present invention is fourthly characterized in that a driving position of the actuator in the disengaged state is set to be further towards the disengaging side, relative to a driving position at the time of disengaging the clutch in a normal gear shift conducted during running of the vehicle.

Further, the present invention is fifthly characterized in that the clutch control system further includes: a rotational angle detection sensor for detecting the rotational angle of a shift drum in the transmission; and a jump-out situation detection unit for detecting a jump-out situation generated in the transmission, based on the rotational angle of the shift drum, wherein the controller regards the jump-out situation as detection of the neutral state and effects transition to the second control unit.

According to the first characteristic of the present invention, the controller disengages the clutch when the engine rotational speed or the vehicle speed is in excess of a predetermined value and the neutral state is detected. Therefore, the load on the transmission gears at the time of gear shifting is reduced, whereby it is made possible, for example, to reduce the thicknesses of the transmission gears and thereby to reduce the weight of the transmission. In addition, it is made possible to prevent an engine stall, a shift shock or the like from being generated at the time of a gear shift from the neutral state to a predetermined gear speed.

According to the second characteristic of the invention, the controller has the first control unit for putting the clutch into a partially engaged state or an engaged state, and the second control unit for putting the clutch into a disengaged state, and the second control unit of the controller instructs the actuator to put the clutch in the disengaged state when it is detected that the engine is working or the vehicle speed is in excess of a predetermined value and the neutral state is detected. Therefore, the load on the transmission gears at the time of gear shifting is reduced, whereby it is made possible, for example, to reduce the thickness of the transmission gears and thereby to reduce the weight of the transmission. Besides, it is made possible to prevent an engine stall, a shift shock or the like from being generated at the time of a gear shift from the neutral state to a predetermined gear speed.

According to the third characteristic of the invention, the second control unit of the controller instructs the actuator to put the clutch in the disengaged state when a predetermined time has passed with the neutral state being detected continuously. Therefore, it is possible to make such a setting that transition to the disengaged state is not effected based only on temporary detection of the neutral state. This ensures that, for example at the time of shifting a shift drum type sequential transmission from 1st gear speed to 2nd gear speed, the clutch is prevented from being disengaged in response to momentary detection of the neutral position present between the 1st gear speed and the 2nd gear speed. Thus, a clutch control adapted to the practical operating conditions can be realized.

According to the fourth characteristic of the invention, a driving position of the actuator in the disengaged state is set to be further towards the disengaging side, relative to a driving position at the time of disengaging the clutch in a normal gear shift conducted during running of the vehicle. Therefore, the extent of transmission of the rotational driving force in the disengaged state can be further reduced, as compared with that at the time of a normal gear shift. Consequently, it is possible to reduce at least the shock at the time of a gear shift from the neutral state to a predetermined gear speed.

According to the fifth characteristic of the invention, the clutch control system includes the rotational angle sensor for detecting the rotational angle of the shift drum in the transmission, and the jump-out situation detection unit for detecting a jump-out situation generated in the transmission, based on the rotational angle of the shift drum, and the controller regards detection of the jump-out situation as detection of the neutral state. Therefore, it is possible to prevent an engine stall or a shift shock or the like from being generated, even when a gear shifting operation is carried out after generation of the jump-out situation.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
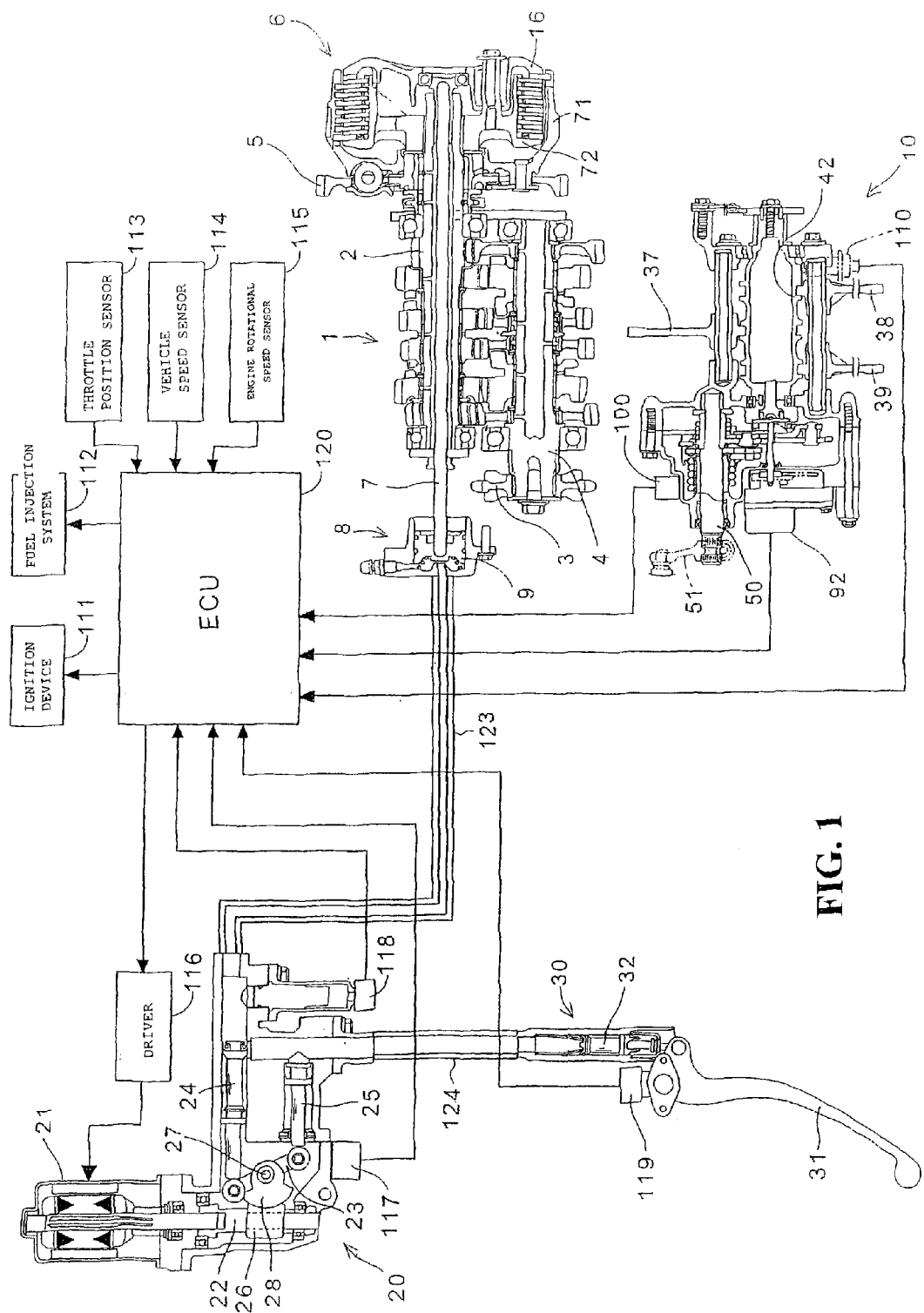
FIG. 1 is a block diagram showing the configuration of a clutch control system according to one embodiment of the present invention, together with the peripheral apparatuses.

Now, a preferred embodiment of the present invention will be described in detail below, referring to the drawings. FIG. 1 is a block diagram showing the configuration of a clutch control system according to one embodiment of the present invention, together with the peripheral apparatuses. A transmission 1 applied to a motorcycle has 1st-speed to 6th-speed transmission gear pairs for transmitting a rotational driving force, between a main shaft 2 as an input shaft and a counter shaft 4 as an output shaft, both of which are rotatably borne on an engine case (not shown) while having axes parallel to each other. Incidentally, the transmission 1 of a normally meshed type, in which the transmission gear pairs are sequentially changed over by intermittently rotating a shift drum, has a configuration generally known as a sequential-type multi-gear-speed transmission for motorcycle. Therefore, detailed description of the transmission 1 is omitted.

A clutch 6 for switching the connection (transmission) and disconnection (non-transmission) of a rotational driving force of an engine serving as a motive power source is provided between the main shaft 2 of the transmission 1 and a crankshaft (not shown) of the engine. The rotational driving force of the engine is transmitted from a primary driven gear 5, meshed with a primary drive gear (not shown) fixed to the crankshaft, to the main shaft 2 through the clutch 6. The rotational driving force transmitted to the main shaft 2 is then transmitted to the counter shaft 4 through one transmission gear pair selected by a gear shift mechanism 10 which will be described later. A drive sprocket 3 is fixed to one end part of the counter shaft 4, and the rotational driving force of the engine is transmitted to the rear wheel (not shown) as a drive wheel through a drive chain (not shown) wrapped around the drive sprocket 3.

The clutch 6 includes a clutch outer 71 which is fixed to the primary driven gear 5 and which holds a plurality of drive friction disks, a clutch inner 72 which is fixed to the main shaft 2 and which holds driven friction disks brought into contact with the drive friction disks to generate a frictional force, and a pressure plate 16 mounted to the main shaft 2 so as to be movable in the axial direction. The pressure plate 16 is normally pushed leftward in the figure by a springy force of a clutch spring, and, due to the pushing force, the frictional force enabling transmission of the rotational driving force of the engine is generated between the drive friction disks and the driven friction disks.

In addition, the pressure plate 16 can be moved in the axial direction by sliding a push rod 7, which penetrates the main shaft 2. In this configuration, the clutch 6 is in an engaged state when the push rod 7 is not slid. On the other hand, when the push rod 7 is pushed by a force against the springy force of the clutch spring and is thereby slid rightwards in the figure, the pressure plate 16 is moved in the direction for separation of the drive friction disks and the driven friction disks from each other, resulting in that the clutch 6 is operated in the direction for disengagement. In this instance, by regulating the pushing force exerted on the push rod 7, a partially engaged state between the engaged state and the disengaged state can also be obtained. The push rod 7 is in abutment on an end part of a hydraulic piston 9 of a clutch slave cylinder 8 fixed to the engine case, and the hydraulic piston 9 pushes the push rod 7 rightwards in the figure when a predetermined oil pressure is supplied into an oil passage 123.

The gear shift mechanism 10, for selecting one gear train for transmitting the rotational driving force, is contained in the inside of the engine case, like the transmission 1. The gear shift mechanism 10 is so configured that a shift pedal (not shown) swingably mounted to the vehicle body of the motorcycle is operated by the rider, and an operating force given at the time of the shifting operation turns a shift drum 42, thereby effecting a gear shifting operation. In this embodiment, the shift pedal operated by the rider's left foot is connected to a shift lever 51 fixed to one end part of a shift spindle 50.

The shift drum 42, which has a hollow cylindrical shape, is provided in its surface with three engaging grooves for respective engagement with one-side ends of first to third shift forks 37, 38, 39. Besides, the other-side ends of the first to third shift forks 37 to 39 are engaged respectively with three slidable transmission gears mounted to the main shaft 2 and the counter shaft 4 so as to be slidable in the axial direction. When the shift drum 42 is turned, the first to third shift forks 37 to 39 are slid to predetermined positions in the axial direction which correspond to the gear speed positions, whereby the engaged/disengaged conditions of dog clutches disposed between the slidable transmission gears and the transmission gears adjacent thereto are changed over. As a result, the transmission gear pair by which the rotational driving force of the engine is transmitted is selectively changed over, that is, a gear shifting operation is performed. Incidentally, the dog clutch is a commonly known mechanism for transmitting a rotational driving force between gears adjacent to each other on the same shaft through meshing of a plurality of dog teeth (projected parts) with a plurality of dog holes (recessed parts) in the axial direction.

The gear shift mechanism 10 is provided with a gear position sensor 92 as rotational angle detection means for detecting the rotational angle of the shift drum 42, a neutral switch 110 for detecting the neutral state of the transmission 1 by becoming ON when the shift drum 42 is in a neutral position, and a shift spindle turning amount sensor 100 for detecting the turning amount of the shift spindle 50. Incidentally, according to the gear position sensor 92, the gear speed position of the transmission 1 can be detected based on the rotational angle (turning amount) of the shift drum 42.

A liquid pressure modulator 20 for supplying the clutch slave cylinder 8 with an oil pressure (liquid pressure) is driven by a motor 21 serving as an actuator. When the motor 21 is driven based on a driving signal from a driver 116, a worm gear 26 engaged with a rotary shaft 22 is rotated. The worm gear 26 is meshed with a worm wheel 28 turned about a swing shaft 27. One end of the worm wheel 28 turns by making contact with a swinging member 23 swingable about the swing shaft 27, and a roller provided at one end part of the swinging member 23 is in contact with a first hydraulic piston 24. With this configuration, when the motor 21 is driven to rotate in a predetermined direction, the one end part of the swinging member 23 pushes the first hydraulic piston 24, whereby an oil pressure can be generated in the oil passage 123.

On the other hand, in this embodiment, a clutch master cylinder 30 is provided which is attached to a left-side steering handle bar (not shown) of the motorcycle and which is operated by the rider's left hand. The clutch master cylinder 30 is so configured that when the rider grips a clutch lever 31, the hydraulic piston 32 is pushed so as to generate an oil pressure in an oil passage 124. The oil passage 124 is connected to the liquid pressure modulator 20. When a predetermined oil pressure is generated in the oil passage 124, in this configuration, a second hydraulic piston 25 provided in the liquid pressure modulator 20 is pushed. One end part of the second hydraulic piston 25 is so disposed as to abut on the other end side of the above-mentioned swinging member 23. The swinging member 23 is so provided that it can push the first hydraulic piston 24 by swinging independently from the worm wheel 28. This ensures that, when the second hydraulic piston 25 is pushed, the first hydraulic piston 24 is pushed, irrespectively of the operating condition of the motor 21. Consequently, the rider's operation is given a higher priority in generating an oil pressure in the oil passage 123.

The liquid pressure modulator 20 is provided with a worm wheel turning amount sensor 117 for detecting the turning amount of the worm wheel 28, and an oil pressure sensor 118 for detecting the oil pressure generated in the oil passage 123. In addition, the clutch master cylinder 30 is provided with a clutch operation amount sensor 119 for detecting the operation amount of the clutch lever 31.

An ECU 120 is supplied with signals from a throttle position sensor 113 for detecting the position of a throttle operated in conjunction with a rider's throttle operation, a vehicle speed sensor 114 for detecting the running speed of the motorcycle, and an engine rotational speed sensor 115 for detecting the rotating speed of the engine. In addition, the ECU 120 is supplied also with signals from a shift spindle turning amount sensor 100 as shift pedal operation amount detection means, the gear position sensor 92 and the neutral switch 110, which are provided at the gear shift mechanism 10, and further with signals from the worm wheel turning amount sensor 117 and the oil pressure sensor 118, which are provided at the liquid pressure modulator 20. Based on the signals from the just-mentioned various sensors, the ECU 120 controls an ignition device 111, a fuel injection system 112, and the driver 116.

According to the configuration as above, a manual shift operation not requiring any clutch operation can be achieved by a process in which a turning motion of the shift drum is effected by the rider's operating force and only the engagement/disengagement of the clutch is automatically controlled. This makes it possible to obtain an operation feeling of practically turning the shift drum through the shift pedal, unlike in the case of an automatic transmission in which the turning motion of the shift drum is also effected by a motor.

Figure 2:
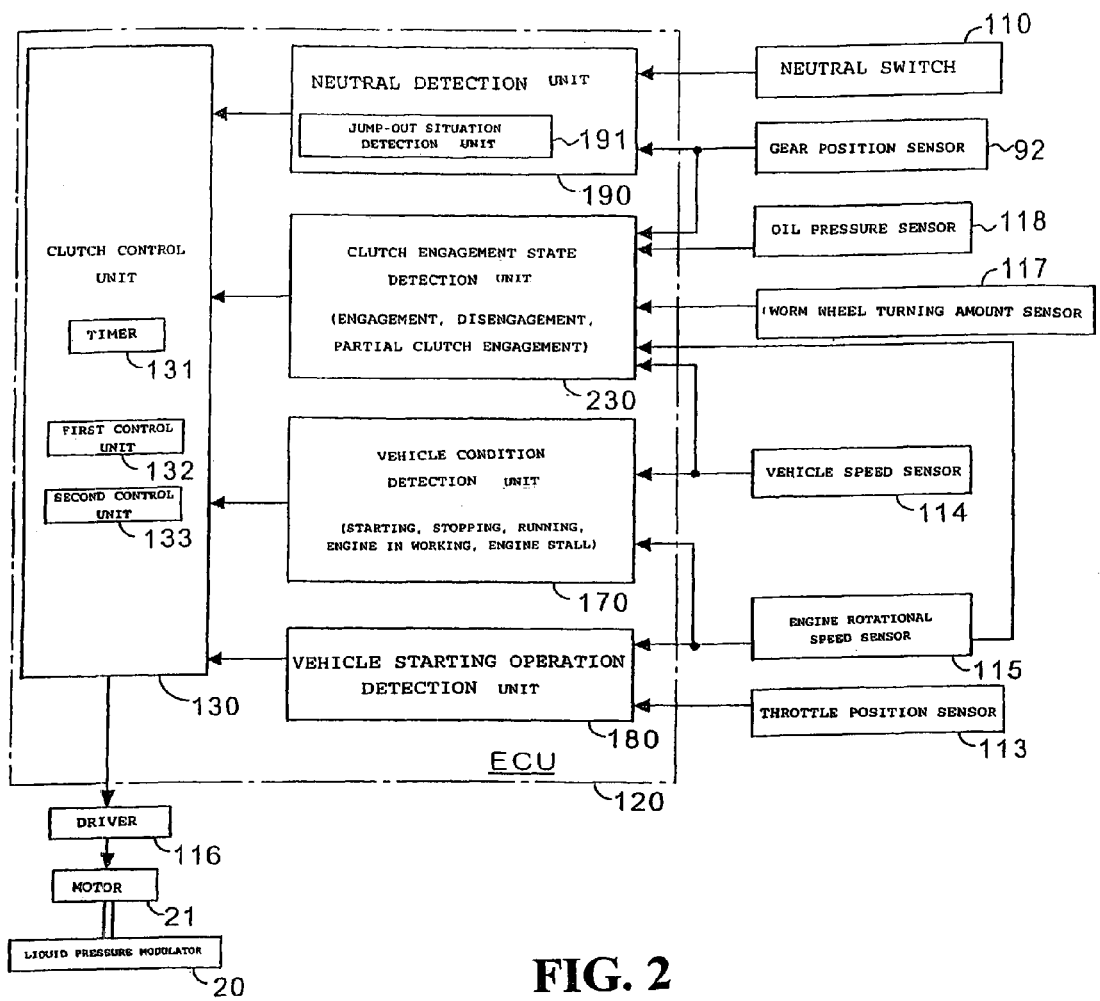
FIG. 2 is a block diagram showing the configuration of the clutch control system according to one embodiment of the invention.

FIG. 2 is a block diagram showing the configuration of the clutch control system according to one embodiment of the present invention. The same symbols as used above denote the parts which are the same as or equivalent to those shown above. The ECU 120 includes a clutch control unit 130 as control means for controlling the engagement/disengagement of the clutch 6 by driving the liquid pressure modulator 20, neutral detection unit 190 for detecting that the transmission 1 is in the neutral state, clutch engagement state detection unit 230 for detecting the engagement state of the clutch 6, vehicle condition detection unit 170 for detecting the running condition(s) of the vehicle, and vehicle starting operation detection unit 180 for detecting a vehicle starting operation made by the rider. In addition, the clutch control unit 130 includes a timer 131 for counting a predetermined time, a first control unit 132 for carrying out a first control state (clutch engaged or partially engaged) which will be described later, and a second control unit 133 for carrying out a second control state (clutch disengaged) which will be described later.

During normal running of the vehicle, the clutch control unit 130 automatically controls the engagement/disengagement of the clutch 6, based on the rider's vehicle starting operation and gear shifting operation, so as to achieve smooth running of the vehicle. The clutch control unit 130 in this embodiment is characterized in that it shifts the clutch 6 into the disengaged state when the neutral state of the transmission is detected during operation of the engine or during running of the vehicle.

The neutral detection unit 190 detects that the transmission 1 is in the neutral state, based on output signals from the gear position sensor 92, which detects the rotational angle of the shift drum 42, and the neutral switch 110 which detects that the shift drum 42 is in the neutral position. This configuration makes it possible to detect the neutral state more assuredly, as compared to the system of detecting the neutral state through either one of the sensors.

Jump-out situation detection unit 191 included in the neutral detection unit 190 detects the generation of a condition where the dog clutch between the transmission gears is not meshed and the rotational driving force cannot therefore be transmitted to the drive wheel, i.e., the so-called "jump-out situation (the condition where the transmission has jumped out of gear)," based on the rotational angle of the shift drum 42. This jump-out situation is detected based on the fact that the shift drum 42 is stopped between a predetermined rotational angle corresponding to the selection of a predetermined gear speed and a given rotational angle adjacent to the predetermined rotational angle.

The clutch engagement state detection unit 230 can detect the engagement state (engaged state, disengaged state, or the like) of the clutch, based on an output signal(s) from at least one of the oil pressure sensor 118, the worm wheel turning amount sensor 117, the gear position sensor 92, the vehicle speed sensor 114, and the engine rotational speed sensor 115.

For example, in the case where the worm wheel turning amount sensor 117 for detecting the turning amount of the worm wheel 28 in the liquid pressure modulator 20 is used, the driving position of the clutch can be detected based on the output signal from the sensor. Besides, in the case where the gear position sensor 92 and the vehicle speed sensor 114 as well as the engine rotational speed sensor 115 are used, the actual sliding amount of the clutch, i.e., the extent of the partial clutch engagement being generated can also be detected, based on the gear speed position of the transmission and the ratio of the rotating speed on the input side of the clutch 6 to the rotating speed on the output side of the clutch 6.

The vehicle condition detection unit 170 can detect the various operating conditions of the vehicle (starting, stopping, running, engine in working, engine stall, etc.), based on output signals from the engine rotational speed sensor 115 and the vehicle speed sensor 114. For example, when the engine is working and the vehicle speed has begun to increase from zero, the vehicle can be judged as having been started. When the engine is working and the vehicle speed is not more than a predetermined value, the vehicle can be judged as being at a stop with idling.

The clutch control unit 130 controls the oil pressure generated in the liquid pressure modulator 20, based on output signals from the neutral detection means 190, the clutch engagement state detection unit 230, the vehicle condition detection unit 170 and the vehicle starting operation detection unit 180, to thereby drivingly control the clutch 6.

Figure 3:
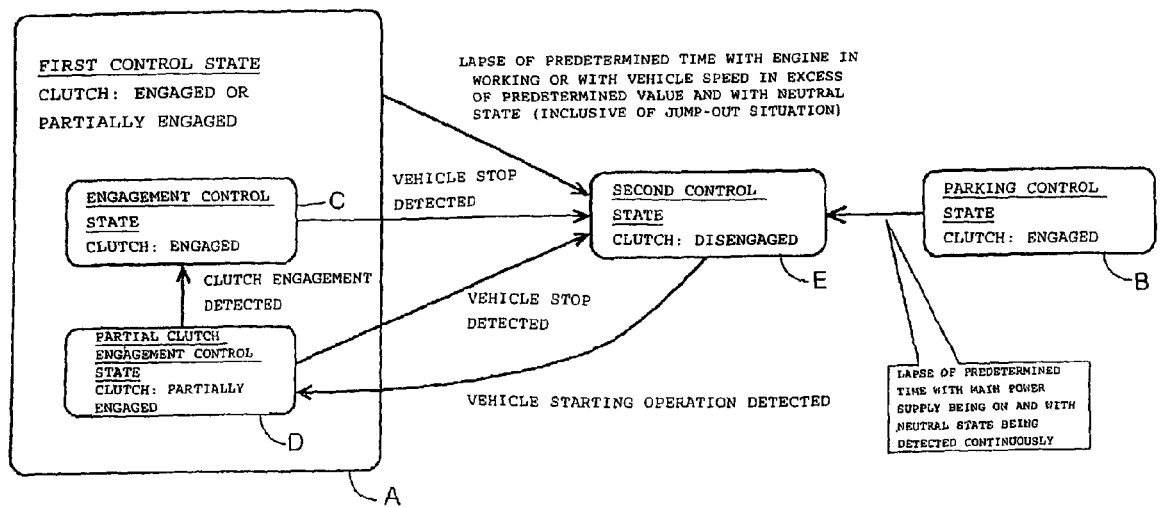
FIG. 3 is a state transition diagram showing the configuration of the clutch control according to one embodiment of the invention.

FIG. 3 is a state transition diagram showing the configuration of clutch control according to one embodiment of the present invention. As controlled states of the clutch 6 (hereinafter referred also to simply as "clutch"), there are set a first control state A (carried out by first control unit 132) in which the clutch is engaged or is partially engaged, and a second control state E (carried out by second control unit 133) in which the clutch is disengaged. In addition, the first control state A is composed of an engagement control state C in which the clutch is engaged, and a partial clutch engagement control state D in which the clutch is partially engaged, i.e., is put in a partial clutch engagement state.

The engagement control state C corresponds to a running condition where the clutch is completely engaged. Besides, the partial clutch engagement control state D corresponds to a condition where the clutch is partially engaged so as to achieve smooth starting of the vehicle. Incidentally, a parking control state B in which the clutch is engaged corresponds to a parking condition where the engine is stopped with the transmission in an in-gear condition.

In this embodiment, such a setting is made that transition to the second control state E is effected when, in the first control state A composed of the engagement control state C and the partial clutch engagement control state D, a predetermined time has passed with the engine working and with the vehicle speed in excess of a predetermined value and with the transmission in the neutral state. This corresponds, for example, to a situation in which the transmission is shifted into the neutral state during starting or running of the vehicle in which the engine rotational speed or the vehicle speed exceeds a predetermined value.

In this case, transition to the second control state E occurs and the clutch is disengaged, so that it is possible to prevent such a trouble as an engine stall and a shift shock from occurring at a gear shift from the neutral state to a predetermined gear speed. Incidentally, the predetermined time is counted by a timer 131 in the clutch control unit 130. Besides, in the parking control state B, a setting is made such that transition to the second state E is effected when a predetermined time has passed with the main power supply being ON and with the transmission in the neutral state.

Furthermore, the detection of the neutral state is carried out also in the case where a jump-out situation is detected by the jump-out situation detection unit 191. For example, when the clutch is kept in the engaged state even after generation of the jump-out situation during running, an operation of the shift pedal for dissolving this situation results in that a shock is liable to be generated when the dog clutch in the transmission is meshed. In this embodiment, however, the clutch is disengaged also when the jump-out situation is detected during running, so that it is possible to reduce the shock at the time of shifting from the jump-out situation to the in-gear condition.

In addition, the condition for transition from the first control state A to the second control state E is established even if the engine is at a stop, insofar as the vehicle speed is in excess of the predetermined value. Therefore, for example in the case where the engine is stopped during running of the vehicle and where a jump-out situation is generated, transition to the second control state E is effected and the clutch is disengaged, whereby the shock at the time of shifting to the in-gear condition can be reduced.

Furthermore, the condition for transition from the first control state A to the second control state E includes the lapse of the predetermined time with the neutral state being detected continuously. This setting is for preventing transition to the second control state E from occurring based only on momentary detection of the neutral state. As a result, for example at the time of shifting the transmission from the 1st gear speed to the 2nd gear speed, the clutch is prevented from being disengaged based on the momentary detection of the neutral state present between the 1st gear speed and the 2nd gear speed. Thus, a clutch control adapted to the practical operating conditions can be realized. The predetermined time can be modified arbitrarily, and can, for example, be set to nearly zero, according to the conditions of the vehicle.

Next, when a rider's vehicle starting operation is detected in the second control state E, transition to the partial clutch engagement control state D is effected. This corresponds to an action of putting the clutch into a partial clutch engagement state so as to enable smooth starting of the vehicle. Incidentally, the detection of the vehicle starting operation can be made based on the determination that, after the shifting of the transmission from the neutral state to a predetermined gear speed, the engine rotational speed detected by the engine rotational speed sensor 115 has exceeded a predetermined value or the throttle position detected by the throttle position sensor 113 has exceeded a predetermined value.

In addition, when a vehicle stop is detected in the partial clutch engagement control state D, return to the second control state E is effected, and the clutch is disengaged. On the other hand, when engagement of the clutch is detected in the partial clutch engagement control state E, transition to the engagement control state C in which the clutch is engaged is effected. This corresponds to an action of conforming the clutch control state to that during normal running in response to the completion of a smooth starting of the vehicle. Incidentally, the condition for transition from the partial clutch engagement control state D to the engagement control state C can be set to be the case where it is detected that the clutch has been completely engaged, based on the sliding amount of the clutch which is detected by the clutch engagement state detection means 230.

When a vehicle stop is detected in the engagement control state C, transition to the second control state E is effected. This corresponds to an action of disengaging the clutch for enabling vehicle-stop-with-idling in an in-gear condition when the vehicle is stopped from a running condition.

Incidentally, in this embodiment, the disengaged state of the clutch in the second control state E is set on the further disengaging side relative to that in the case where the clutch 6 is disengaged at the time of a gear shift during running. This is realized by setting the driving amount of the motor 21 in the liquid pressure modulator 20 to be greater than that at the time of a normal gear shift. According to this setting, the extent of transmission of the rotational driving force to the main shaft 2 of the transmission 1 is reduced, as compared with that at the time of a normal gear shift during running, whereby it is possible at least to reduce the shock at the time of shifting from the neutral state to an in-gear condition.

Figure 4:
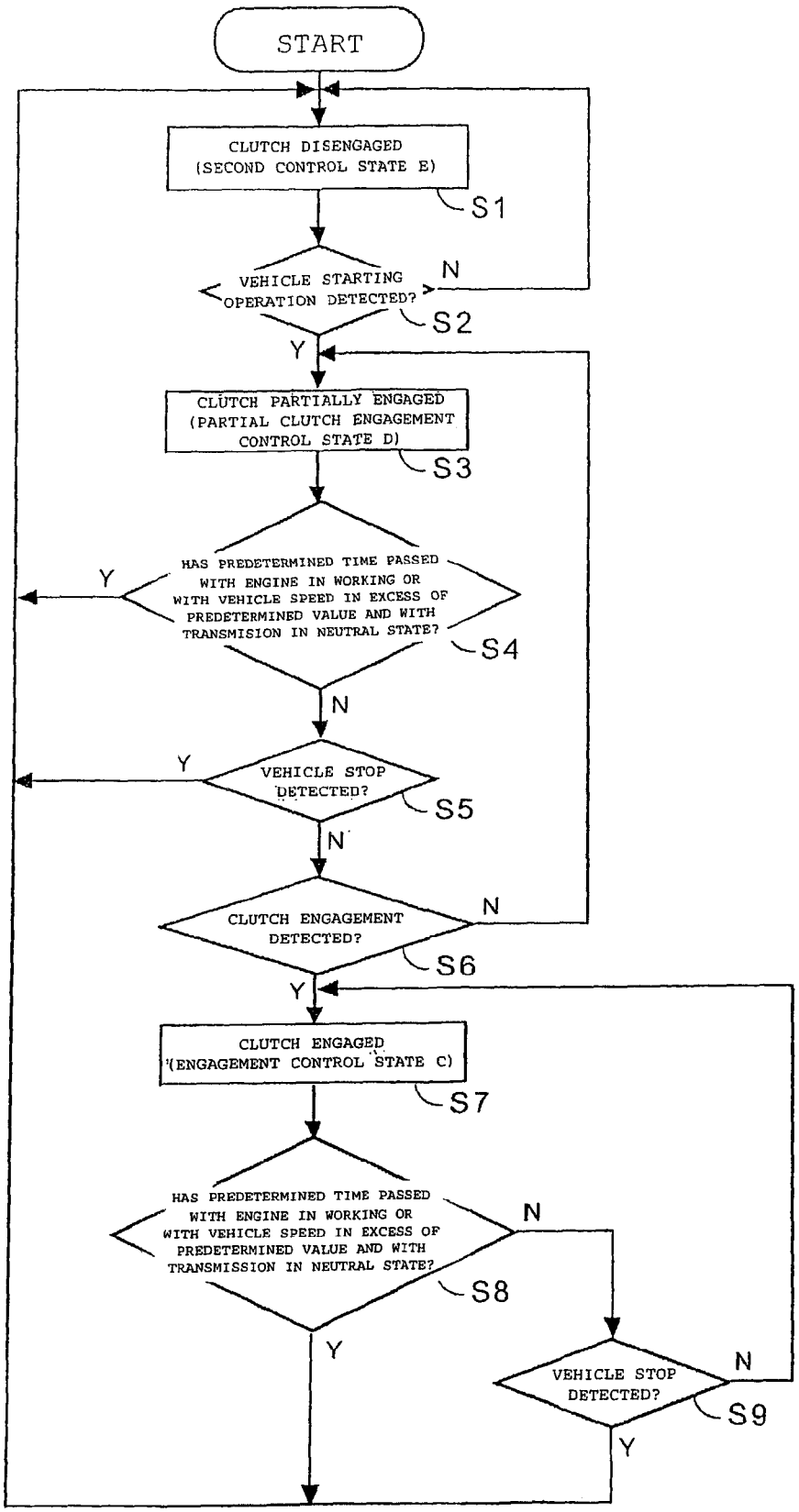
FIG. 4 is a flow chart showing the flow of clutch control according to one embodiment of the invention.

FIG. 4 is a flow chart showing the flow of clutch control according to the present embodiment. This flow chart corresponds to the state transition diagram shown in FIG. 3. In step S1, the clutch control is in the second control state E in which the clutch is disengaged so as to at least reduce the shock at the time of shifting from the neutral state to an in-gear condition.

In the subsequent step S2, it is judged whether or not a rider's vehicle starting operation has been detected. If the judgment at step S2 is affirmative, step S3 is entered, to effect transition to the partial clutch engagement control state D in which the clutch is partially engaged (put into the partial clutch engagement state) so as to enable smooth starting of the vehicle. Incidentally, if the judgment at step S2 is negative, the control process returns to step S1, and the second control state E is maintained.

In the subsequent step S4, it is judged whether or not the engine is working or the vehicle speed is in excess of a predetermined value and the neutral state has been detected. If the judgment at step S4 is affirmative, it is judged that the vehicle has been stopped before complete engagement of the clutch after the starting of the vehicle, and the control process returns to step S1, in which transition to the second control state E is made. On the other hand, if the judgment at step S4 is negative, step S5 is entered, in which it is determined whether or not the vehicle has been stopped. If the judgment at step S5 is affirmative, it is judged that the vehicle has been stopped after shifting to the neutral state after the starting of the vehicle, and the control process returns to step S1, in which transition to the second control state E is made. On the other hand, if the judgment at step S5 is negative, step S6 is entered, in which it is determined whether or not the clutch has been engaged.

If the judgment at step S6 is affirmative, it is judged that the vehicle starting motion has been completed smoothly, and step S7 is entered, to engage transition to the engagement control state C in which the clutch is engaged. Incidentally, if the judgment at step S6 is negative, the control process returns to step S3, and the partial clutch engagement control state D is maintained.

Then, in step S8, it is again judged whether or not the engine is working or the vehicle speed is in excess of the predetermined value and the neutral state has been detected. If the judgment is affirmative, the control process returns to step S1, and transition to the second control state E is effected. Incidentally, if the judgment at step S8 is negative, step S9 is entered, in which it is again judged whether or not the vehicle has been stopped. If the judgment at step S9 is affirmative, it is judged that the vehicle has been stopped, and the control process returns to step S1, to effect transition to the second control state E. If the judgment at step S9 is negative, the control process returns to step S7, and the engagement control state C is maintained.

As above-described, according to the clutch control system of the present invention, as controlled states of the clutch, there are set the first control state A in which the clutch is in a partially engaged state or an engaged state, and the second control state E in which the clutch is disengaged. In addition, when the engine is detected to be working or the vehicle speed is detected to be in excess of a predetermined value and the neutral state is detected, in the first control state A, transition to the second control state E is effected and the clutch is disengaged. Therefore, it is possible to prevent an engine stall or a shift shock or the like from being generated at the time of a gear shift from the neutral state to a predetermined gear speed. This makes it possible to prevent an engine stall or a shift shock or the like from being generated at the time of again shifting from the neutral state to an in-gear condition by disengaging the clutch when the transmission is shifted into the neutral state during vehicle-stop-with-idling in an in-gear condition or when the transmission is shifted into the neutral state during normal running. In addition, also in the case where a jump-out situation is generated in the transmission, it is judged that the transmission has been put into the neutral state, and transition to the second control state E is effected. Therefore, it is possible to reduce the shock at the time of shifting from the jump-out situation into an in-gear condition. Besides, the load on the transmission gears at the time of a gear shift is reduced, whereby a reduction in the weight of the transmission can be achieved.

Incidentally, the layout and configurations of the transmission, the gear shift mechanism, the liquid pressure modulator, the ECU, and the various sensors, the methods of detection of the neutral state, detection of the clutch engaged state, detection of the starting operation, and detection of the vehicle stop condition, etc. are not limited to those in the above-described embodiment, and various modifications thereof are possible. For example, the engagement control in the partial clutch engagement control state and the like can be arbitrarily changed according to the configuration of the transmission and the like. Incidentally, the clutch control system according to the present invention is applicable not only to the above-mentioned motorcycle but also to three-wheel and four-wheel vehicles which have an engine as a motive power source.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A clutch control system for a clutch operative to engage and disengage transmission of a rotational driving force from an engine of a vehicle to a transmission, comprising:
   an actuator which engages and disengages said clutch;
   a controller which controls operation of said actuator;
   an engine rotational speed sensor which detects the rotational speed of said engine;
   a vehicle speed sensor which detects the vehicle speed of said vehicle; and
   a neutral detection unit which detects a neutral state of said transmission,
   wherein said controller automatically transitions said clutch from an engaged or partially engaged state to a disengaged state when (i) the neutral state is detected, and (ii) the engine rotational speed is in excess of a predetermined engine speed value or the vehicle speed is in excess of a predetermined vehicle speed value.

2. A clutch control system for a clutch operative to engage and disengage transmission of a rotational driving force from an engine of a vehicle to a transmission, comprising:
an actuator which engages and disengages said clutch;
a controller which controls operation of said actuator;
a vehicle condition detection unit which detects at least that said engine is working and which detects the vehicle speed of said vehicle; and
a neutral detection unit which detects a neutral state of said transmission,
wherein said controller comprises a first control unit which instructs said actuator to put said clutch into a partially engaged state or an engaged state and a second control unit which instructs said actuator to put said clutch into a disengaged state; and
wherein said second control unit of said controller automatically instructs said actuator to transition said clutch from an engaged or partially engaged state to a disengaged state when (i) the neutral state is detected, and (ii) said engine is working or the vehicle speed is in excess of a predetermined value.

3. The clutch control system as set forth in claim 2, wherein said second control unit of said controller instructs said actuator to put said clutch into the disengaged state when a predetermined time has passed with the neutral state being detected continuously.

4. The clutch control system as set forth in claim 2, wherein a position of said actuator in the disengaged state is set to be further towards a disengaging side, relative to a position of said actuator at a time of disengaging said clutch in a normal gear shift conducted during running of said vehicle.

5. The clutch control system as set forth in claim 3, wherein a position of said actuator in the disengaged state is set to be further towards a disengaging side, relative to a position of said actuator at a time of disengaging said clutch in a normal gear shift conducted during running of said vehicle.

6. The clutch control system as set forth in claim 2, further comprising:
a rotational angle sensor which detects the rotational angle of a shift drum in said transmission; and
a jump-out situation detection unit which detects a jump-out situation generated in said transmission, based on the rotational angle of said shift drum,
wherein said second control unit of said controller regards detection of the jump-out situation as detection of the neutral state.

7. The clutch control system as set forth in claim 3, further comprising:
a rotational angle sensor which detects the rotational angle of a shift drum in said transmission; and
a jump-out situation detection unit which detects a jump-out situation generated in said transmission, based on the rotational angle of said shift drum,
wherein said second control unit of said controller regards detection of the jump-out situation as detection of the neutral state.

8. The clutch control system as set forth in claim 4, further comprising:
a rotational angle sensor which detects the rotational angle of a shift drum in said transmission; and
a jump-out situation detection unit which detects a jump-out situation generated in said transmission, based on the rotational angle of said shift drum,
wherein said second control unit of said controller regards detection of the jump-out situation as detection of the neutral state.

9. The clutch control system as set forth in claim 5, further comprising:
a rotational angle sensor which detects the rotational angle of a shift drum in said transmission; and
a jump-out situation detection unit which detects a jump-out situation generated in said transmission, based on the rotational angle of said shift drum,
wherein said second control unit of said controller regards detection of the jump-out situation as detection of the neutral state.

10. The clutch control system as set forth in claim 1, wherein said transmission includes a shift drum, and said shift drum is actuated by a rider, via a shift pedal.

11. The clutch control system as set forth in claim 2, wherein said transmission includes a shift drum, and said shift drum is actuated by a rider, via a shift pedal.

* * * * *